(12) United States Patent
Posa

(10) Patent No.: US 8,790,452 B2
(45) Date of Patent: Jul. 29, 2014

(54) METHOD AND SYSTEM FOR SEPARATING AND DESTROYING SOUR AND ACID GAS

(71) Applicant: Richard Paul Posa, North Tonawanda, NY (US)

(72) Inventor: Richard Paul Posa, North Tonawanda, NY (US)

(*) Notice: Subject to any disclaimer, the term of this patent is extended or adjusted under 35 U.S.C. 154(b) by 0 days.

(21) Appl. No.: 13/772,787

(22) Filed: Feb. 21, 2013

(65) Prior Publication Data

US 2013/0213223 A1    Aug. 22, 2013

Related U.S. Application Data

(60) Provisional application No. 61/601,812, filed on Feb. 22, 2012.

(51) Int. Cl.
*B01D 53/14* (2006.01)

(52) U.S. Cl.
USPC ........ 96/242; 95/42; 95/196; 95/214; 95/227; 95/228; 95/229; 95/236

(58) Field of Classification Search
None
See application file for complete search history.

(56) References Cited

U.S. PATENT DOCUMENTS

| | | | |
|---|---|---|---|
| 4,425,317 A | | 1/1984 | Zeller et al. |
| 4,881,953 A * | | 11/1989 | Prasad et al. ................... 95/41 |
| 5,407,466 A * | | 4/1995 | Lokhandwala et al. ......... 95/49 |
| 6,585,801 B2 * | | 7/2003 | Hattori et al. ................... 95/49 |
| 6,793,712 B2 * | | 9/2004 | Qualls ............................. 95/92 |
| 7,374,742 B2 | | 5/2008 | Geosits et al. |
| 7,377,956 B2 | | 5/2008 | Cheney, Jr. et al. |
| 7,429,287 B2 * | | 9/2008 | Frantz ............................. 95/49 |
| 7,901,585 B1 | | 3/2011 | Lehtinen |
| 8,206,669 B2 * | | 6/2012 | Schaffer et al. .............. 423/210 |
| 2008/0233025 A1 | | 9/2008 | Hwang |
| 2008/0282612 A1 * | | 11/2008 | De Bas et al. ................ 48/127.7 |
| 2009/0199712 A1 | | 8/2009 | Menzel et al. |
| 2010/0063343 A1 | | 3/2010 | Cusumano et al. |
| 2010/0077767 A1 | | 4/2010 | Balmas et al. |
| 2011/0120012 A1 | | 5/2011 | Balmas et al. |
| 2011/0138854 A1 | | 6/2011 | Huang et al. |
| 2012/0027655 A1 | | 2/2012 | Schaffer et al. |
| 2012/0168154 A1 | | 7/2012 | Chinn et al. |
| 2012/0279728 A1 | | 11/2012 | Northrop et al. |

FOREIGN PATENT DOCUMENTS

| | | |
|---|---|---|
| WO | WO 2005/086963 | 9/2005 |
| WO | WO 2010/115898 | 10/2010 |

* cited by examiner

*Primary Examiner* — Duane Smith
*Assistant Examiner* — Phillip Shao
(74) *Attorney, Agent, or Firm* — Simpson & Simpson, PLLC

(57) ABSTRACT

A system adapted to separate a natural gas feed stream into a sweetened gas stream, at least one liquid waste stream and at least one gaseous waste stream, and to discharge, recover or destroy the at least one liquid waste stream and the at least one gaseous waste stream. The system includes a compression subsystem adapted to treat the natural gas feed stream to remove a first portion of the at least one liquid waste stream and to increase the natural gas feed stream to a process pressure greater than an initial entering pressure to form a pressurized natural gas stream, a gas pretreatment subsystem adapted to treat the pressurized natural gas stream to remove a second portion of the at least one liquid waste stream and to cool and filter the pressurized natural gas stream to form a filtered natural gas stream, an acid gas separation subsystem adapted to separate the filtered natural gas stream into the sweetened gas stream and a first portion of the at least one gaseous waste stream, and an destruction subsystem adapted to incinerate the first portion of the at least one gaseous waste stream to form a flue gas.

11 Claims, 3 Drawing Sheets

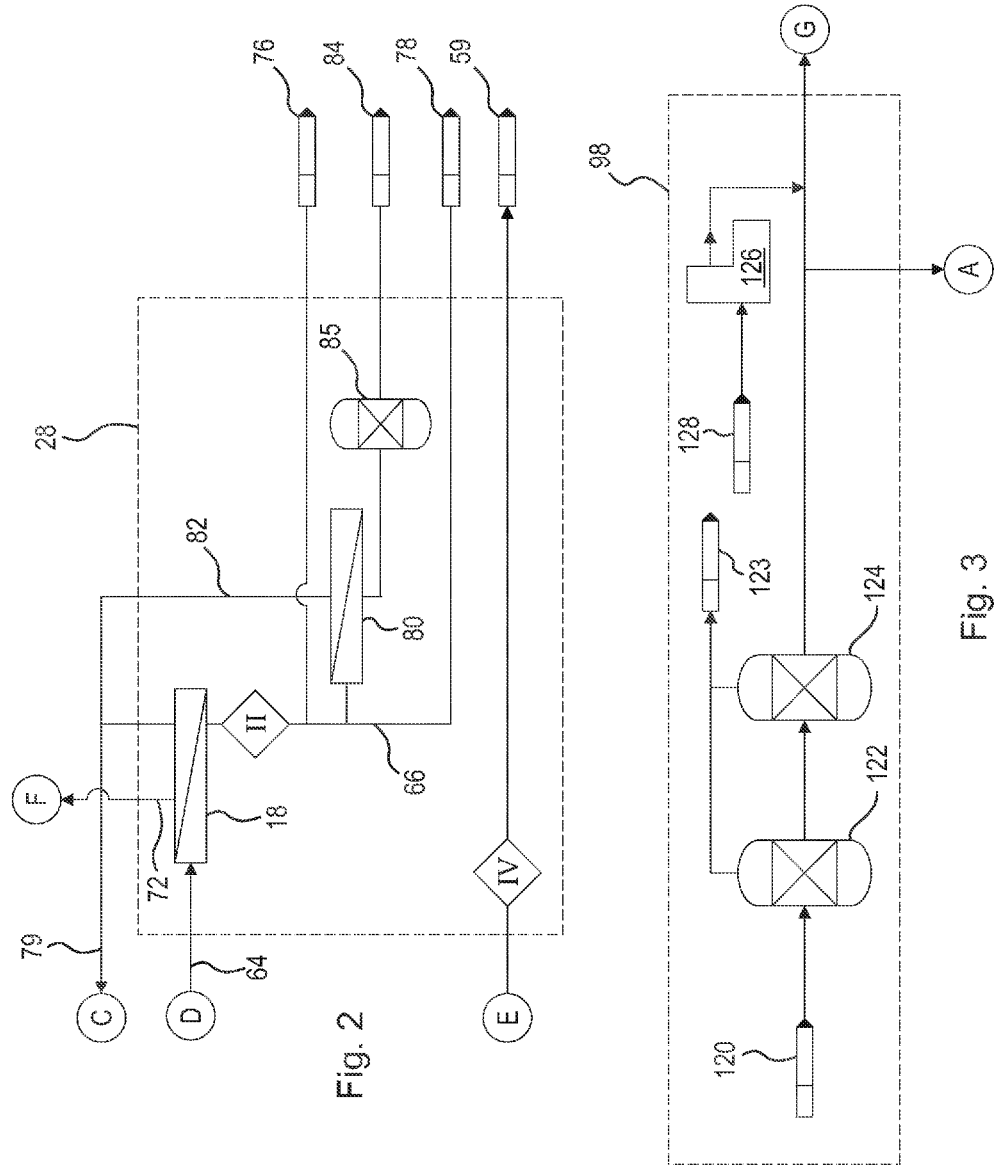

METHOD AND SYSTEM FOR SEPARATING AND DESTROYING SOUR AND ACID GAS

CROSS-REFERENCE TO RELATED APPLICATIONS

This patent application claims the benefit under 35 U.S.C. §119(e) of U.S. Provisional Patent Application No. 61/601,812, filed Feb. 22, 2012, which application is incorporated herein by reference.

TECHNICAL FIELD

The presently disclosed embodiments are directed to producing useable natural gas from sour and acid gas, as well as eliminating carbon and sulfur dioxide atmospheric pollution produced by burning of contaminated natural gas. The presently disclosed embodiments may be used on maritime platforms and land based sour and/or acid gas sources.

BACKGROUND

Natural gas, a gas mixture formed primarily of methane which may also include ethane, propane, butane, pentane and higher molecular weight hydrocarbons, is a vital component of the world's supply of energy as a source of providing heat and electricity, and fuel for vehicles. It is also used as a chemical feedstock in the manufacture of plastics and other commercially important organic chemicals. Natural gas may be harvested or synthesized as a primary product or may be a byproduct of other oil exploration activities, and is abundant in the United States. Natural gas is clean burning and emits lower levels of potentially harmful byproducts into the air than some other fossil fuels. Natural gas is found in deep underground natural rock formations or associated with other hydrocarbon reservoirs in coal beds and as methane clathrates. Petroleum is also another resource found in proximity to and with natural gas.

Different types of natural gas are found in a variety of sources. Associated petroleum gas (APG), also known as flare gas, is natural gas found in association with deposits of petroleum. APG has been historically released as a waste product from the petroleum extraction industry. Due to the remote location of many oil fields, either at sea or on land, APG is considered a nuisance byproduct and is typically burned off using a gas flaring device. Over 150 billion cubic meters of NM type natural gas are flared or vented annually by World Bank estimates, which is approximately equal to about 25% of the natural gas consumed in the USA in 2012. Shale gas is natural gas formed from being trapped within shale formations. Shale gas has become an increasingly important source of natural gas in the United States since 2000, when shale gas provided only 1% of U.S. natural gas production. With the development of hydrofracturing technology, by 2010 shale gas represented over 20% of U.S. natural gas production, and predictions indicate that shale gas will represent 46% of the U.S. natural gas supply by 2035. Coal bed methane (CBM) results when methane is adsorbed into the solid matrix of coal. CBM is also referred to as "sweet gas" due to its lack of hydrogen sulfide. CBM is distinct from typical sandstone or other conventional gas reservoirs, as the methane is stored within the coal by a process called adsorption. The methane is in a near-liquid state, lining the inside of pores within the coal. CBM typically comprises low levels of $H_2S$ and $CO_2$. Biogas methane can be generated as a byproduct of anaerobic biochemical activity. Digesters, landfills and commercial biogas generators are used for converting man-made wastes into energy, i.e., biogas methane.

Natural gas is colorless, shapeless, and odorless in its pure form, and is combustible. It is one of the cleanest, safest, and most useful of all energy sources. When burned, natural gas gives off a great deal of energy and while producing few emissions. In other words, natural gas is clean burning and emits lower levels of potentially harmful byproducts than other fossil fuels. While natural gas is formed primarily of methane, it can also include ethane, propane, butane, pentane and higher molecular weight hydrocarbons. Natural gas does not typically exist as a pure hydrocarbon mixture, but includes other components as shown in Table 1 below. In some gas fields, higher molecular weight petroleum liquids can be associated with natural gas. These liquids bring additional commercial value to the natural gas.

TABLE 1

| Composition of Natural Gas - representative | | |
| --- | --- | --- |
| Methane | $CH_4$ | 70-90% |
| Heavier hydrocarbons | $C_2H_6+$ | 0-20% |
| Carbon Dioxide | $CO_2$ | 0-8% |
| Oxygen | $O_2$ | 0-0.2% |
| Nitrogen | $N_2$ | 0-5% |
| Water vapor | $H_2O$ | 0-1% |
| Particles | | trace |
| Hydrogen sulfide | $H_2S$ | 0-5% |
| Rare gases | Ar, He, Ne, Xe | trace |

Natural gas is generally classified based on the quantity of acidic gases present in the mixture, i.e., primarily hydrogen sulfide and carbon dioxide. Sweet gas is natural gas of a quality that is pure enough to be commercially used, typically <2% carbon dioxide and <25 parts per million hydrogen sulfide. In order to be useable, natural gas must either be sweet gas direct from the source or must be treated to sweet gas levels. Sour gas is natural gas or any other gas containing significant amounts of hydrogen sulfide ($H_2S$), which can be as high as 25%. However, the threshold of what is considered significant varies by country, state, or even agency or application. Acid gas is generally classified as natural gas or any other gas mixture containing significant quantities of acidic gases, typically hydrogen sulfide ($H_2S$), carbon dioxide ($CO_2$), or similar acidic contaminants which can be greater than 25%.

A variety of environmental problems are associated with harvesting natural gas. Generally, when a gas well is developed, i.e., completion, but before the natural gas is harvested for commercial use, the initial gas must be purged as it is generally not usable. Historically, the initial gas has been burned using flaring equipment. Regulatory agencies worldwide are putting substantial pressure to eliminate this practice and are moving to green completion strategies. Associated petroleum gas, i.e., APG, was historically not considered a commercial product. Generally, the main objective is to recover crude oil, and the associated gas is merely an unwanted byproduct that is just flared. As oil wells mature, APG can become increasingly contaminated with $H_2S$ and $CO_2$. As such, flaring puts substantial amounts of carbon into the atmosphere. Moreover, flaring sour gas generates substantial amounts of $SO_2$ which converts to $H_2SO_4$ in the atmosphere, which leads to acid rain. With more stringent regulations on flaring and greater public awareness of global warming, oil producers are faced with handling APG in a more environmentally way. Although the foregoing environmental issues are present regardless of the location of oil exploration, exploration and production activities offshore have limited options currently for handling APG, and specifically sour and acid gas. APG associated with ocean platforms raise serious issues as the exploration and production activities offshore presently have limited options for handling APG, and specifically sour and acid gas.

Known natural gas handling procedures suffer from a variety of drawbacks. Flaring has historically been the most common treatment method as it is simple and low monetary cost; however, it is likely to become increasingly restricted within the foreseeable future due to changes in various regulations. Deep well injection, i.e., reinjection of the sour gas, has also been used as a method of handling sour gas. It is believed that this activity merely delays the problem as the reinjected gas eventually may return to the source reservoir or well. With respect to conveying sour gas to shore from maritime platforms, various methods have been used to convey acid gas to shore. Since the gas is extremely corrosive, exotic and expensive materials must be used in building the necessary pipelines. Once the sour or acid gas arrives on shore, it still requires treatment to make it useable. Sour or acid gas handling may comprise amine process on platform or on shore. Before a raw natural gas containing hydrogen sulfide or carbon dioxide can be used, the raw gas must be treated to remove those impurities to acceptable levels, commonly accomplished by an amine gas treating process. The removed $H_2S$ is most often subsequently converted to by-product elemental sulfur in a Claus processor, or it can be treated in a wet sulfuric acid process unit where the by-product is sulfuric acid. The foregoing amine process has commercial limitations on high $H_2S$ and $CO_2$ content streams. Furthermore, amine systems have limited commercial use on platforms. They are very expensive, large, require the use of chemicals and generate substantial amounts of process byproducts that need to be transported to shore for disposal or reuse.

Heretofore, the oil and gas exploration industry, has been faced with capturing and handling natural gas in an environmentally responsible way; however, known systems are complex and expensive. As sour and acid gas must be treated not only at land operations but also on maritime platforms, a solution is needed that can address a variety of problems. There has been a long felt need and thus the present method and system includes: a small foot print; a minimum weight; a simple, easy operating procedure; flexibility to treat different stream chemistries, such as it must be able to handle high concentration of $H_2S$ and down hole chemistry additions for controlling scaling and corrosion; use of minimum consumables and chemicals; minimum waste generation; cost effective operation; and, conversion of wastes to usable products; the capacity to substantially reduce the amounts of $H_2S$, $CO_2$ and water so that standard pipeline material can be used to convey natural gas to shore. Furthermore, there has been a long felt need for a method and system of producing fuel gas by treating acid and sour gas to an acceptable quality to be used to drive compressors and electrical generators on the maritime platforms. Still yet further, there is a long felt need for natural as being of sufficient quality for use in enhanced oil recovery (EOR) so that it does not contaminate crude oil reservoirs as the gas is injected to recover oil. In view of the foregoing, it can be seen a novel system and method are needed to extract sweetened gas from sour and acids gas feeds that minimize the addition of carbon and sulfur dioxide to the atmosphere, while meeting water and air regulatory requirements.

SUMMARY

Broadly, the present invention discussed infra provides a system adapted to separate a natural gas feed stream into a sweetened gas stream, at least one liquid waste stream and at least one gaseous waste stream, and to discharge, recover or destroy the at least one liquid waste stream and the at least one gaseous waste stream. The system includes a compression subsystem adapted to treat the natural gas feed stream to remove a first portion of the at least one liquid waste stream and to increase the natural gas feed stream to a process pressure greater than an initial entering pressure to form a pressurized natural gas stream, and a gas pretreatment subsystem adapted to treat the pressurized natural gas stream to remove a second portion of the at least one liquid waste stream and to cool and filter the pressurized natural gas stream to form a filtered natural gas stream. The system further includes an acid gas separation subsystem adapted to separate the filtered natural gas stream into the sweetened gas stream and a first portion of the at least one gaseous waste stream, and an destruction subsystem adapted to incinerate the first portion of the at least one gaseous waste stream to form a flue gas.

In some embodiments, the compression subsystem includes at least one of: a liquid separation unit adapted to treat the natural gas feed stream to remove the first portion of the at least one liquid waste stream; and, a compressor adapted to increase a pressure of the natural gas feed stream to the process pressure. In some embodiments, the gas pretreatment subsystem includes at least one of: a gas cooler adapted to cool the pressurized natural gas stream; a liquid separation unit adapted to treat the pressurized natural gas stream to remove the second portion of the at least one liquid waste stream; a heat exchanger adapted to cool the pressurized natural gas stream; and, a gas filter adapted to treat the pressurized natural as stream to remove particulates and water vapor. In some embodiments, the acid gas subsystem includes at least one of: a first membrane separator adapted to separate the filtered natural gas stream into the sweetened gas stream and the first portion of the at least one gaseous waste stream; a second membrane separator adapted to treat the sweetened gas stream to remove a second portion of the at least one gaseous waste stream; and, a polisher adapted to polish the sweetened gas stream. In some embodiments, the destruction subsystem includes at least one of: an incinerator adapted to combust the first portion of the at least one gaseous waste stream; and, a heat exchanger adapted to cool the flue gas.

In some embodiments, the system further includes a feed water pretreatment subsystem adapted to filter a water stream to form a filtered water stream, wherein the filtered water stream cools the pressurized natural gas stream in the gas pretreatment subsystem. In some embodiments, the feed water pretreatment subsystem includes at least one of: a first continuous particle filter adapted to filter the water stream; a second continuous particle filter adapted to filter the water stream; and, a chemical feeder adapted to condition the filtered water stream.

In some embodiments, the system further includes a scrubber reactor subsystem adapted to receive the filtered water stream and to remove at least one portion of the flue gas using the filtered water stream to form a vent gas stream and a wastewater stream, wherein the vent gas is exhausted to the atmosphere. In some embodiments, the scrubber reactor subsystem includes at least one of: a scrubber reactor adapted to remove at least one portion of the flue gas using the filtered water stream; and, a blower adapted to provide air to the scrubber reactor.

In some embodiments, the system further includes a wastewater treatment subsystem adapted to filter the wastewater stream to form a discharge water stream. In some embodiments, the wastewater treatment subsystem includes at least one of: a particulate filter adapted to remove particulates from the wastewater stream; a metal unit adapted to remove metal from the wastewater stream; and, a mercury unit adapted to remove mercury from the wastewater stream.

According to aspects illustrated herein, there is provided a method for separating a natural gas feed stream into a sweetened gas stream, at least one liquid waste stream and at least one gaseous waste stream, and for discharging, recovering or destroying the at least one liquid waste stream and at least one gaseous waste stream. The method includes: a) treating the natural gas feed stream to remove a first portion of the at least one liquid waste stream; b) pressurizing the natural gas feed stream to a process pressure greater than an initial entering pressure to form a pressurized natural gas stream; c) treating the pressurized natural gas stream to remove a second portion of the at least one liquid waste stream; d) cooling and filtering the pressurized natural gas stream to form a filtered natural gas stream; e) separating the filtered natural gas stream into the sweetened gas stream and a first portion of the at least one gaseous waste stream; and, f) incinerating the first portion of the at least one gaseous waste stream to form a flue gas.

In some embodiments, the method further includes: c1) filtering a water stream to form a filtered water stream, wherein the filtered water stream in part cools the pressurized natural gas stream in step d). In some embodiments, the method further includes: g) removing at least one portion of the flue gas using the filtered water stream to form a vent gas stream and a wastewater stream; and, h) exhausting the vent gas to the atmosphere. In some embodiments, the method further includes: i) filtering the wastewater stream to form a discharge water stream.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which:

FIG. 2 is a second portion of a schematic diagram of a present invention system for separating and/or destroying sour and acid gas depicting an acid gas separation subsystem;

FIG. 3 is a third portion of a schematic diagram of a present invention system for separating and/or destroying sour and acid gas depicting a feed water pretreatment subsystem; and, FIG. 4 is a four portion of a schematic diagram of a present invention system for separating and/or destroying sour and acid gas depicting a destruction subsystem, a scrubber reactor subsystem and a wastewater treatment subsystem.

DETAILED DESCRIPTION

Figure 1:
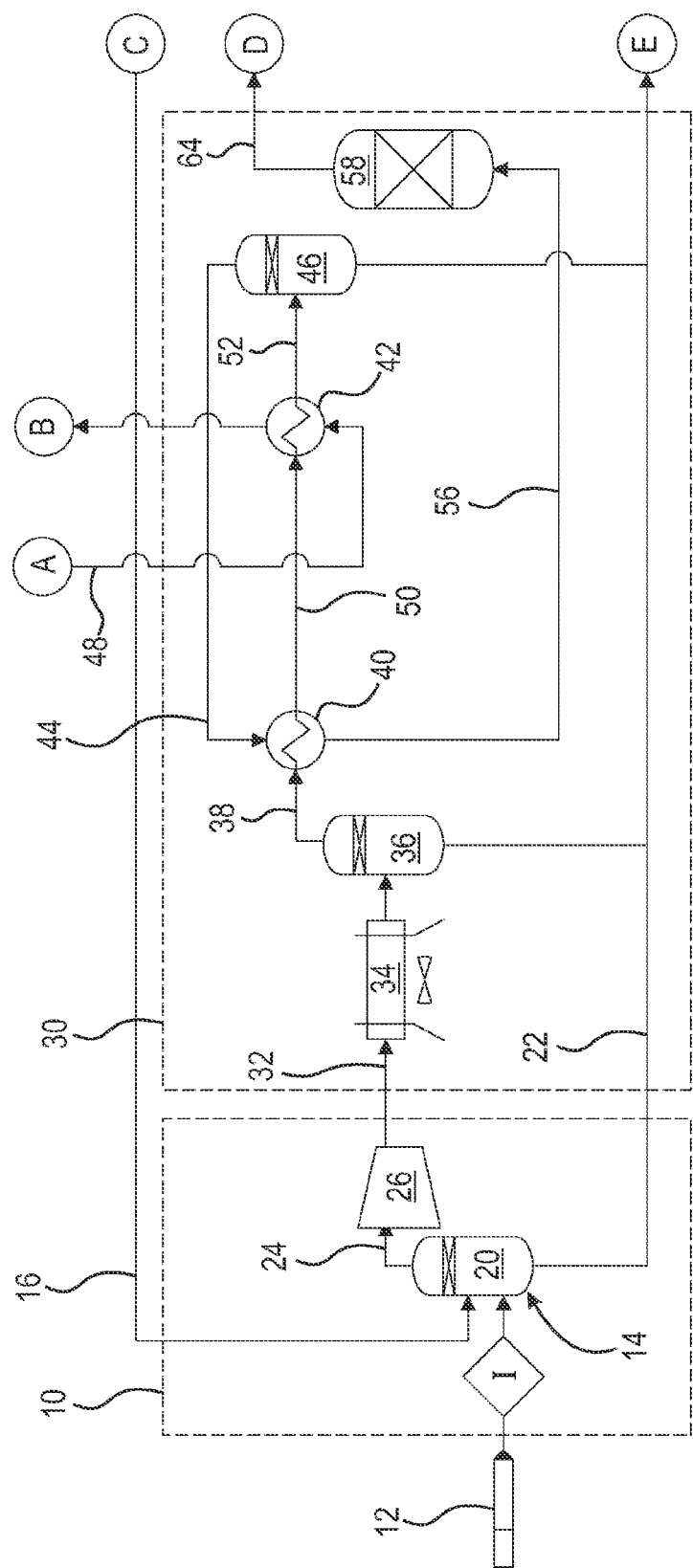
FIG. 1 is a first portion of a schematic diagram of a present invention system for separating and/or destroying sour and acid gas depicting a compression subsystem and a gas pretreatment subsystem.
Figure 4:
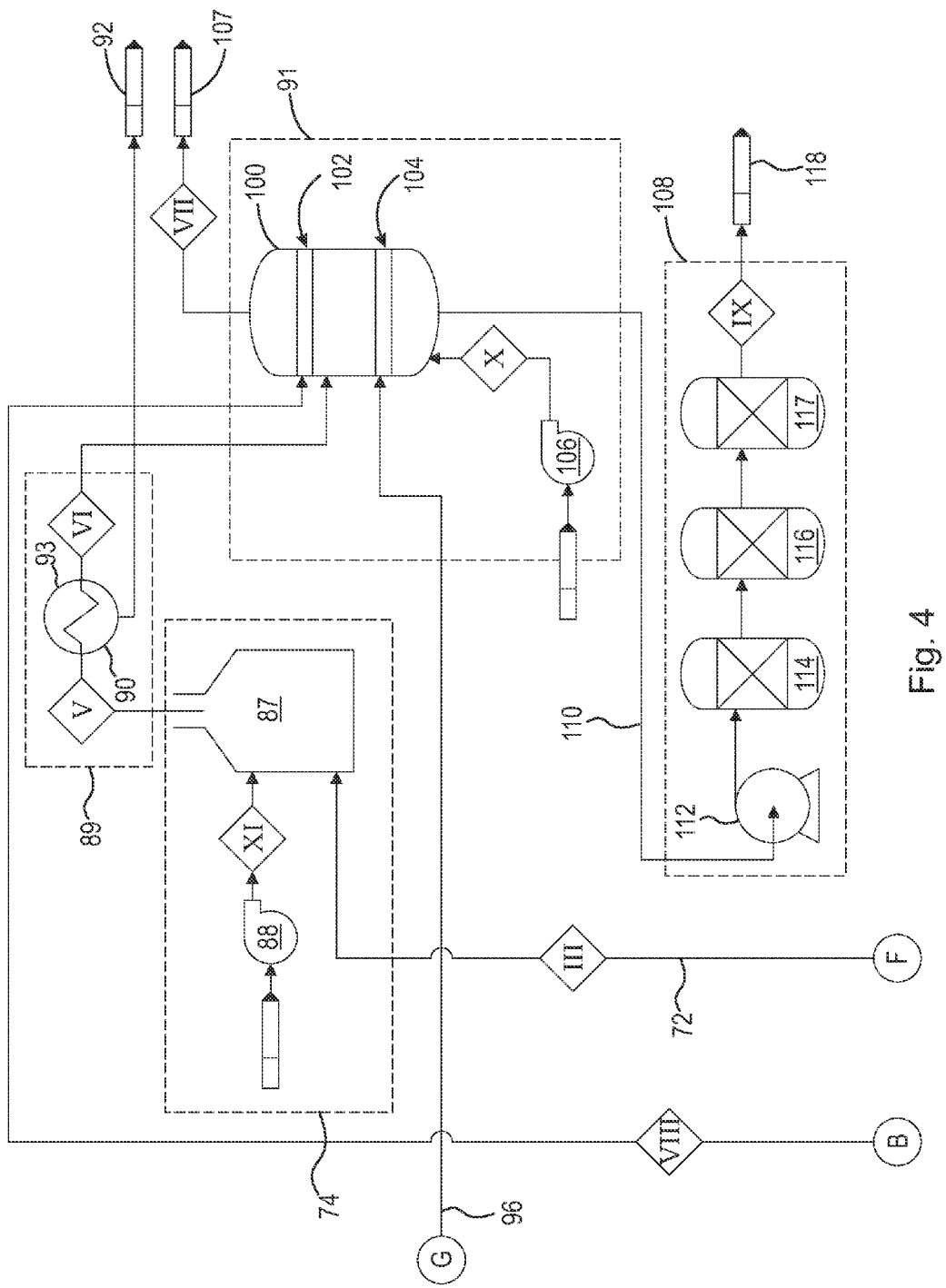

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, the term "average" shall be construed broadly to include any calculation in which a result datum or decision is obtained based on a plurality of input data, which can include but is not limited to, weighted averages, yes or no decisions based on rolling inputs, etc. Furthermore, as used herein, the phrase "to treat . . . to remove" is intended to mean performing an operation on a component to remove all or some of a constituent within the component, wherein the extent of partial removal is further described infra, while the phrase "to treat . . . to adsorb" is intended to mean performing an operation on a component to adsorb all or some of a constituent within the component, wherein the extent of partial adsorption is further described infra. As used herein, "sweetened gas" is intended to mean a resulting gas stream after removal of some portion of sour and/or acid gas from a starting as stream. For example, a sweetened gas stream comprises lower levels of sour and/or acid gas than the natural gas stream from which the sweetened gas stream was derived. As used herein, "sour gas" is intended to mean a natural gas stream having increased levels of hydrogen sulfide relative to another natural gas stream, while "acid gas" is intended to mean a natural gas stream having increased levels of hydrogen sulfide, carbon dioxide, or similar acidic contaminants relative to another natural gas stream. Furthermore, as used throughout the specification, "sour gas" and "acid gas" are used interchangeably, and any reference to one is to be understood to refer to either or both. "Waste stream", as used herein, is intended to mean a stream, liquid or gas, that may be disposed of, discharged, burned or otherwise destroyed, as well as a stream that may be include a recoverable energy or recoverable commercial component, e.g., heat, pressure, flow rate, which is recovered prior to disposal, etc. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

The present method and system utilizes the natural resources available near natural gas operations, e.g., resources available on a maritime platform such as seawater and air, to meet the requirements of the desired finished product and other outputs. Broadly, the present method comprises the following three primary steps: 1) Separate and recover sweetened gas for fuel and/or commercial use using membrane gas separation technology, where the separation generates various streams which may include sweetened gas, sour gas and acid gas; 2) Destroy the sour and/or acid gas using a high temperature incinerator which converts $H_2S$ gas to $SO_2$; and, 3) Capture Carbon, e.g., $CO_2$, and further convert $SO_2$ to $SO_4$ by use of a scrubber system reactor that converts $SO_2$ with seawater and $O_2$ from the atmosphere to $SO_4$ and by use of sea water to adsorb $CO_2$ which can then be discharged into the ocean. It should be noted that $SO_4$ and $CO_2$ are natural components of ocean water.

Broadly, the present system and method provides the following benefits and features, which benefits and features are discussed in greater detail infra. The present invention can handle high concentrations of $CO_2$ and $H_2S$, and uses little, if any, amounts of chemicals or consumables as the primary process ingredients are sour gas, sea water and air. Little process waste is generated that requires further treatment or transportation to shore. The present invention accommodates feed gas variations and fluctuations, while it provides sweetened gas that can be transferred to an alternate location for commercial use, e.g., to shore, injected to enhance oil recovery, or provide fuel gas at the site of production, e.g., on a maritime platform. Based on the end use of the sweetened gas, treatment may be required to further sweeten gas by removal of additional sour and/or acid gas, as well as other byproducts. The present invention recovers energy in the form of sweetened gas, petroleum liquids and heat recovery from the process of converting $H_2S$ to $SO_4$. It is believed that the total energy recovery can be in excess of 90%. The present invention captures substantially all $CO_2$ and $H_2S$ thereby preventing discharge to the atmosphere. Sea water used in the present system and method is prepared with a continuous filtration process that is small in footprint and weight. The present invention requires little cleaning water and the some waste products can be directly discharged to the ocean. The present gas pretreatment system is flexible in design so that it can be tailored to meet various site conditions and feed stream chemistry. The present system can be run at various compressed gas pressures, and multiple steps of liquid and water separation are utilized to prepare the gas stream for processing. Moreover, final filtration and adsorption is used to ensure proper operation of the membrane system to minimize operational issues that may arise due to natural components in the gas mixture or other compounds that may be added during oil and gas recovery operations. The present invention includes a flexible and robust pretreatment design to prevent fouling and destruction of the membranes. Such foulants include but are not limited to mercury, salts, asphaltenes, waxes, water, compressor oil, lubricants and additives, mercaptans, oxygen, aromatics, glycols, methanol, amines, sulfur, etc. The present membrane system is designed on a site specific basis to meet the specific performance requirements. The present membrane system can be run at high or low pressure and provide more variation in foot print and purity. The present system and method recycle sour and acid gas for higher carbon recovery and optimizes the quality of the sweetened gas and increases yield by passing it several times through the separation stage. The membranes can be staged on the sweetened gas or acid gas stream to deliver different system performance. Depending on the stream chemistry and process design, $CH_4$ can be allowed to pass the membrane in varying amounts or blended downstream to assist in the burning of acid gas. The present system is flexible and can use most membranes on the market, e.g., spiral or hollow fiber, as well as with various membrane materials of construction. Additional polishing is added to the final gas so it can be used at the processing location as fuel gas for running generators and compressors.

The incinerator is an efficient, high temperature incinerator specifically designed for $H_2S$ destruction which converts virtually all hydrocarbons and $H_2S$ to water, $CO_2$ and $SO_2$. The flue gas from the incinerator is cooled down by a heat exchanger in preparation for feed to the scrubber reactor. The present method is optimized to recover energy for further use at the processing location, e.g., on a maritime platform. Furthermore, a scrubber having a small footprint uses high surface area packed media and the natural chemistry in combination with atmospheric air to convert $SO_2$ to $SO_4$, while $CO_2$ is dissolved to carbonic acid which is buffered by the natural alkalinity of the sea water. A second scrubber reactor zone adds additional sea water to further the reaction goals of buffering pH, reducing temperature, and providing additional oxygen to complete $SO_2$ conversion along with additional alkalinity to dissolve and neutralize $CO_2$. Moreover, additional alkalinity can be used to enhance the reaction and adjust pH, e.g., using standard water treatment chemicals such as lime, soda ash or caustic soda. The present system and method can utilize feed water pulled directly from the ocean for processing location at or near an ocean. It has been found that using water found deeper in the ocean may be preferred as it typically has more oxygen present, the water is cooler and includes less suspended solids than at the ocean surface. It should be appreciated that the additional dissolved $O_2$ and lower temperature aids in the reaction used in the present system and method. Wastewater may need to be post treated, based on the chemistry of the acid gas, for particles, metal and potentially mercury, and the present invention provides for such post treatment. The present post treatment design is flexible and depends on the makeup of the discharged wastewater from the scrubber. For example, if particulate loading exceeds discharge limits filtration may be required, or if metals or mercury are in the wastewater stream, special ion exchange resin can be used to remove those components to meet discharge requirements. The present invention provides further benefits as wastewater is discharged below the ocean surface, and depending on the wastewater chemistry, discharged in a deep distribution or dilution pipeline. At ocean depths which could exceed 1000 feet and long discharge pipelines, residual $SO_2$ will be force into solution and have sufficient reaction time to complete conversion to $SO_4$ before being released to the ocean. Wastewater is slowly dissipated into the ocean across a long slotted distribution header.

FIGS. 1 through 4 depict a typical embodiment of a present invention system for treatment of a sour or acid gas stream to produce sweetened natural gas and properly dispose of the acid and sour gas residuals and other waste byproducts. It should be noted that in order to depict the present invention with sufficient detail in the figures, the system was broken in to portions and distributed across FIGS. 1 through 4. The connections between the separate portions are represented by encircled letters. For example, one connection between FIG. 1 and FIG. 3 is shown by the encircled 'A'. Moreover, the diamond shaped elements designated by roman numerals, II, III, IV, etc., are included as a representative example of the various process characteristics. Such values are merely provided as an example and are not intended to limit the scope of the claimed invention, which invention is limited only by the appended claims. Tables 2 and 3 herebelow includes the foregoing example process characteristics.

TABLE 2

| # | Description | Phase | Flowrate (LBMOL/HR) | Pressure (Bars) | Temp (deg C.) |
|---|---|---|---|---|---|
| I | Sour/Acid Gas Feed | Gas/Liquid | 769 | 1 | 38 |
| II | Treated Gas | Gas | 226 | 34.5 | 1 |
| III | Acid Gas | Gas | 60 | 1 | 45 |
| IV | Condensed Liquids | Gas/Liquid | 483 | 34 | 25 |
| V | Incinerator Flue Gas | Gas | 578 | 1 | 1500 |
| VI | Incinerator Flue Gas | Gas | 578 | 1 | 150 |
| VII | Scrubbed Vent Gas | Gas | 659 | 0 | 80 |
| VIII | Seawater | Liquid | 528 | 5 | 25 |
| IX | Scrubber Blowdown | Liquid | 528 | As required | 60 |
| X | Air | Gas | 124 | 1 | 25 |
| XI | Air | Gas | 564 | 1 | 25 |

TABLE 3

| | Mole Fraction | | | | | | |
|---|---|---|---|---|---|---|---|
| # | $H_2O$ | $H_2S$ | $CO_2$ | $N_2$ | $CH_4$ | C2+ | $O_2$ | $SO_x$ |
| I | 0.05 | 0.20 | 0.15 | 0.05 | 0.22 | 0.33 | 0.00 | 0.00 |
| II | 0.00 | 0.01 | 0.04 | 0.16 | 0.64 | 0.15 | 0.00 | 0.00 |
| III | 0.03 | 0.36 | 0.39 | 0.00 | 0.08 | 0.14 | 0.00 | 0.00 |
| IV | 0.08 | 0.26 | 0.18 | 0.00 | 0.04 | 0.44 | 0.00 | 0.00 |
| V | 0.14 | 0.00 | 0.09 | 0.71 | 0.00 | 0.00 | 0.03 | 0.02 |
| VI | 0.14 | 0.00 | 0.09 | 0.71 | 0.00 | 0.00 | 0.03 | 0.02 |
| VII | 0.07 | 0.00 | 0.09 | 0.94 | 0.00 | 0.00 | 0.04 | 0.00 |
| VIII | 1.00 | 0.00 | 0.00 | 0.00 | 0.00 | 0.00 | 0.00 | 0.00 |
| IX | 0.96 | 0.00 | 0.00 | 0.00 | 0.00 | 0.00 | 0.00 | 0.04 |
| X | 0.00 | 0.00 | 0.00 | 0.79 | 0.00 | 0.00 | 0.21 | 0.00 |
| XI | 0.00 | 0.00 | 0.00 | 0.79 | 0.00 | 0.00 | 0.21 | 0.00 |

The present invention can accommodate the issue that various feed streams require slight changes in the process design. It should be appreciated that some subsystems or components may not be required based on the gas composition and system needs, and that the scope of the invention is set forth in the claims. The preferred embodiment of the invention is treatment of natural gas at a production location, e.g., on an off-shore platform, coastal processing facility or inland processing operations such as a hydrofracturing operation, that has access to ocean water, or water possessing sufficient alkalinity or added alkalinity, and can discharge byproducts within regulatory requirements, for example into the ocean or a deep well.

Compression

Compression occurring in subsystem 10 is required as the driving force for the primary gas separation process to function. Sour gas feed 12 enters subsystem 10 at separation unit 14 for the initial liquids separation. In the (preferred embodiment of the invention, sour/acid gas feed 12 is supplied at low pressure, e.g., 0-10 pounds per square inch gauge (psig), is blended with recycled acid gas feed 16 from primary membrane separator 18, and then flows to knockout drum 20 to separate entrained liquids or condensed liquids generated by the blending to of sour/acid gas feed 12 and recycle acid gas feed 16. The entrained or condensed liquids are convey in any known means in the art, e.g., pipe 22, to a subsequent processing stage such as gas separation or crude blending operation. Knockout drum 20 is a typical ASME pressure vessel with mist eliminator, such as for example the knockout drum manufactured by Amistco Separation Products, Inc. of Alvin, Tex. The entrained or condensed liquids, which are at low pressure, are typically rich in heavier hydrocarbons thereby possessing good commercial value.

Subsequently liquid-free sour gas feed 24 passes from knockout drum 20 to compressor 26 for compression. Liquid-free sour gas feed 24 is compressed, for example using a reciprocating gas compressor such as the compressor manufactured by Ariel Corporation of Mount Vernon, Ohio. Compressor 26 compresses liquid-free sour gas feed 24 to the necessary driving pressure for separation. Compressor 26 is staged as required to efficiently yield a desired outlet gas pressure and is designed with materials and appurtenances to be compatible with sour gas. In the preferred embodiment of the invention, outlet gas pressure will be 500-900 psig and the driver for compressor 26 is an internal combustion engine, such as the driver manufactured by Caterpillar of Peoria, Ill. The driver can utilize the treated gas from the system as a fuel source thus making the compression subsystem energy independent.

Gas Pretreatment

After compression in subsystem 10, the sour gas must be conditioned to remove contaminants that may inhibit or impair the membrane separation process of subsystem 28. Such conditioning occurs in subsystem 30. Sour gas feed 32 exits compressor 26 at temperatures in excess of 300° F. and must be cooled to about 120° F. before entry to the membrane separator subsystem 28. Sour gas feed 32 is conveyed to primary gas cooler 34. In the preferred embodiment of the invention, primary gas cooler 34 is a wet surface air cooler such as the wet surface air cooler manufactured by Niagara Blower Company of Buffalo, N.Y. Primary gas cooler 34 reduces the temperature of sour gas feed 32 while maintaining an elevated pressure. Cooling the compressed gas will cause water and heavier hydrocarbons to condense as liquids, thus a secondary liquid separation operation is necessary. Secondary liquid separator 36 is used to remove the condensed liquids, which liquids need to be removed prior to conveying the sour gas feed to membrane separator subsystem 28. Secondary liquid separator 36 includes a mist eliminator as described with respect to knockout drum 20 supra. As described above, such liquids can be recovered and possess good commercial value. The liquids removed by separator 36 are at a higher pressure and may contain dissolved $CO_2$ and $H_2S$.

Sour gas feed 38 is cooled further to reduce the dewpoint of the gas entering membrane separator subsystem 28 so that liquids do not condense on the membrane. Gas heater 40 and secondary gas cooler 42 are standard heat exchangers arranged in a heat recovery circuit for this purpose. It should be appreciated that any standard heat exchanging unit that maintains separation between hot and cold fluids may be used, e.g., shell and tube, plate type, etc. Gas heater 40 uses sour gas feed 38 from secondary liquid separator 26, i.e., the "hot" fluid, to superheat dry sour gas feed 44 from final liquid separator 46, i.e., the "cold" fluid, to 100-120° F. In the preferred embodiment of the invention, secondary gas cooler 42 uses ocean water feed 48, i.e., the "cold" fluid, to cool sour gas feed 50 from gas heater 40, i.e., the "hot" fluid, to the extent that the differential temperature between ocean water feed 48 and sour gas feed 50 will typically 60-90° F. depending on the temperature of ocean water feed 48. Condensed liquids exiting secondary gas cooler 42 are removed from sour gas feed 52 using liquid separator 46 which includes a mist eliminator as previously described above. As also described above, the condensed liquids may be recovered and possess good commercial value. The final step in subsystem 30 provides gas conditioning and filtration of sour gas feed 56 prior to conveyance to membrane separator subsystem 28. Gas conditioning and filtration unit 58 typically removes particulates and trace water vapor from sour gas feed 56. In the preferred embodiment of the invention, gas conditioning and filtration unit 58 comprises an ASME pressure vessel filled with activated carbon adsorbent or other purification media followed by a cartridge filter housing with filter such as the cartridge filter housing manufactured by Precision Filtration Products of Pennsburg, Pa.

Liquids obtained from knockout drum 20, secondary liquid separator 36, and liquid separator 46 are removed from the system at output 59, and utilized for further purposes such as gas separation or crude blending.

Acid Gas Separation

Acid gas separation occurring in subsystem 28 is the completion of the present invention separation process. Primary membrane separator 18 provides the bulk separation of acid gas from sour gas feed 64. In other words, primary membrane separator 18 provides the physical separation of various types of gases with a membrane that allows certain gases to permeate through the membrane at different rates. Membranes are selected such that the mass transfer rate across the membrane of $H_2S$ and $CO_2$ are much higher than $CH_4$, thereby generating sweetened natural as stream 66 and acid gas stream 72 that requires further handling. In the preferred embodiment of the invention, the membranes are spiral wound cellulose acetate membrane elements such as the membrane elements manufactured by UOP of Des Plaines, Ill., or hollow fibers such as the hollow fibers manufactured by Air Liquide Medal of Baltimore, Md. The membrane elements are loaded into tubular housings, the quantity and arrangement of which is dictated by the quantity of gas to be processed and desired level of purification.

In the preferred embodiment of the invention, the membranes and housings are arranged in two sets or stages. In the first stage, acid gas permeate is removed as acid gas stream 72 and sent to the acid gas destruction equipment of subsystem 74. Sweetened gas stream 66 from the first stage may be drawn off as treated gas for enhanced oil recovery at output 76, drawn off as treated gas to a conveyance system at output 78 or flows to the second stage where acid gas is further removed. Acid gas fraction 79 is recycled to the front of the process, i.e., subsystem 10, as described above in order to drive greater separation through the membrane by increasing acid gas partial pressure in the sour gas feed 12. Sweetened natural gas stream 66 is collected for sale or use at the processing location. In the preferred embodiment of the invention, sweetened natural gas stream 66 generated by primary membrane separator 18 is used for on-board fuel gas service which requires higher purity than will typically be generated by primary membrane separator 18. If it is desired to treat sweetened gas stream 66 to a higher purity, the high pressure gas exiting primary membrane separator 18 can be further treated to separate additional sour and/or acid gas. Polishing membrane separator 80 is constructed as an array of membrane modules similar to, but in smaller quantity than, primary membrane separator 18. Acid gas stream 82 from polishing membrane separator 80 may be combined with acid gas fraction 79 and flows to the initial liquids separation unit, i.e., subsystem 10, for recycling as previously described, while the treated gas stream from polishing membrane separator 80 flows to output 84 for further use. In some circumstances, additional polishing may be necessary, thereby requiring the inclusion of polisher 85. In such circumstances, there are several known technologies that can be used, where some technologies can be regenerated and some not. For example, iron pellet filters can remove traces of $H_2S$. In view of the foregoing, it should be appreciated that 'polishing' in combination with a gas stream as used herein is intended to mean treating of the gas stream to a higher purity level, e.g., removing traces of $H_2S$ and other contaminates.

Acid Gas Destruction

Acid gas destruction occurs in subsystem 74. The acid gas permeate from primary membrane separator 18 contains high concentration (70-80 mole %) of acid gases, typically $H_2S$ and $CO_2$. The $H_2S$ must be destroyed and the $CO_2$ and byproducts of the $H_2S$ destruction must be disposed of in an environmentally sound way. The acid gas permeate also contains some hydrocarbons (10-15 mole %) that permeate through the membranes of primary membrane separator 18. These hydrocarbon compounds are required as additional fuel to burn the acid gas mixture. The first step in the process is to oxidize, i.e., burn, $H_2S$ in high efficiency incinerator 87, such as the incinerator manufactured by Aecometric Corporation of Richmond Hill, Ontario, Canada. Incinerator 87 converts $H_2S$ to sulfur dioxide. The oxidation reaction occurs at low pressure, e.g., <5 psig, and at high temperature, e.g., 2700° F. Clean atmospheric air is used as a source of combustion air as well as temperature control in incinerator 87. Incinerator air feed blower 88 feeds combustion air to incinerator 87. A representative example of blower 88 is a standard low pressure rotary lobe blower such as the blower manufactured by Kaeser Compressors of Fredericksburg, Va. It should be appreciated that any blower capable of meeting the flow and pressure requirements may be used, e.g., rotary lobe, centrifugal or regenerative turbine blowers.

Flue Gas Cooler and Heat Recovery

Flue gas cooling and heat recovery occurs in subsystem 89. Heat recovery exchanger 90 receives incinerator flue gas at a temperature of approximately 2700° F., which must be cooled ahead of the final scrubbing stage of subsystem 91 prior to discharge to the atmosphere via output 92. In the preferred embodiment of the invention, heat is recovered through waste heat recovery unit 93 such as the recovery unit manufactured by indeck Power Equipment Co. of Wheeling, Ill. The recovered heat may be used for various utility and processing requirements, Waste heat recovery unit 93 is designed to reduce flue gas temperature to <300° F. If necessary, further cooling to <140° F. can be achieved using a standard shell and tube or plate and frame heat exchanger with ocean water as the cooling fluid.

Scrubber Reactor

Scrubbing occurs in subsystem 91. In the preferred embodiment of the invention, seawater provides the oxygen and alkalinity required for scrubbing the $SO_2$ from the cooled flue gas and converting the $SO_2$ to soluble $SO_4$. Additional chemicals may be added to adjust scrubber water stream 96 alkalinity. Such chemicals may include but are not limited to lime, bicarbonate, or sodium hydroxide. This chemical addition step is described below in the section discussing subsystem 98. This chemical addition step may also be used where the feed water chemistry requires additional alkalinity, where ocean water is not available, or where a more rapid reaction is required. Provided sufficient treatment occurs, the ocean is a suitable discharge point for products of the above described incineration and scrubbing reactions, such products already appear naturally in sea water, namely $CO_2$ and $SO_4$.

Scrubber reactor 100 comprises primary reactor zone 102 which absorbs $SO_2$ into the seawater. In the preferred embodiment of the invention, a standard counter current scrubbing tower is filled with random packing media such as the scrubbing tower manufactured by Rasching Jaeger Ring Division of Sun Valley, Calif. Thus, scrubber reactor 100 is used to scrub sulfur dioxide from the cooled flue gas. The flue gas flows up through a high surface area packing along with introduced air. Seawater is introduced at the top of scrubber reactor 100 and flows counter current to the flue gas and air mixture. It should be appreciated that the packing is coated with seawater and provides for a large transfer surface area for transfer of sulfur dioxide from the flue gas to the liquid phase, i.e., seawater. The alkalinity inherent in seawater is required to reduce the sulfur dioxide concentration in the treated flue gas to parts per million (ppm) levels for atmospheric discharge. Once dissolved, sulfur dioxide reacts with water to form sulfite anions according to the reaction shown in Equation (1) herebelow.

$$SO_2 + H_2O \rightarrow H^+ + HSO_3^- \quad (1)$$

Oxygen dissolved in the scrubber water further reacts with the dissolved sulfite to form sulfate in anions. Provided the scrubber water meets the discharge requirements, the water flows back into the sea with a marginally higher concentration of sulfate and $CO_2$. Scrubber reactor 100 further comprises secondary reactor zone 104 where additional seawater is added to a scrubber sump. The additional seawater provides added oxygen, alkalinity to adjust pH and temperature. Scrubber air feed blower 106 provides introduced air as described above. Blower 106 may be a rotary lobe blower as described above, and provides additional oxygen for the $SO_2$ conversion reaction requirements. Scrubbed gas exits scrubber reactor 100 via output 107.

Wastewater Treatment

Wastewater treatment occurs in subsystem 108. A sour gas stream may contain contaminates which may end up in the scrubber water thereby requiring treatment prior to discharge in the ocean. These contaminates may include heavy metals and particulate material. In the preferred embodiment of the invention, final treatment is an ocean pipe line with a dilution header to slowly release the water in the ocean. This pipeline is deep in the ocean and over a long distance to provide for a slow release of wastewater into the ocean at depths where the pressure will ensure dissolved gases will remain in solution and that any residual $SO_3$ will convert to $SO_4$. Wastewater quickly blends with the ocean water equalizing pH, total dissolved solids (TDS) and temperature. Wastewater stream 110 exits scrubber reactor 100 and is conveyed to discharge pump 112. Pump 112 may be a standard centrifugal pump such as the centrifugal pump manufactured by Goulds Pumps of Seneca Falls, N.Y., It should be appreciated that any pump capable of transferring water at the quantity and pressure required would be suitable, e.g., centrifugal, piston or axial flow turbine pumps. Pump 112 pressurizes water through the necessary wastewater treatment equipment and to the ocean discharge pipeline (not shown). Discharge pressure is set as required for the depth of discharge, which is typically greater than 50 psi. Particle filter 114 removes particles generated during the scrubbing process if they exceed regulatory guidelines. Filters may be of a disposable type for low total suspended solid (TSS) levels or a cleanable type as described in ocean feed water pretreatment infra. Metal removal system 116 removes metals that are present in varying quantities depending on the quality of the sour gas. These metals may need to be treated to discharge regulatory requirements. Treatment consists of specific chelating ion exchange resin that will remove metals from salty seawater such as Dow Amberlite™ IRC748 (a macroporous styrene divinylbenzen resin with iminodiacetic acid functional groups) sold by Dow Chemical located in Midland, Mich. These resins can be regenerated on site or removed and sent to a land based facility for regeneration. If necessary, mercury removal system 117 is included prior to discharging wastewater to the ocean via output 118. Mercury removal unit 117 is an ion exchange device that incorporates resins that have a specific affinity for mercury, e.g., DOW XUS-43604 (a thiol type resin containing the —SH functional group) sold by Dow Chemical located in Midland, Mich.

Ocean Feed Water Pretreatment

Ocean feed water pretreatment occurs in subsystem 98. Ocean water has a substantial amount of total suspended solids (TSS). The TSS must be reduced to prevent plugging and fouling of the process equipment. It is advantageous to collect ocean water from a sufficient depth as deeper water contains more dissolved oxygen and less suspended solids. Water feed 120 is pumped under pressure to continuous particle removal screen 122 which contains a series of vertical wedge wire screens to capture large particles in the range of 200 microns and above. An example of a suitable screen is the particle removal screen manufactured by SAMCO Technologies of Buffalo, N.Y. One screen element is backwashed at a time thus maintaining continuous forward flow. Continuous particle removal screen 122 is designed to provide primary filtration. The backwash from screen 122 is sent back to the ocean via output 123. Water exiting continuous particle removal screen 122 is fed to a finer filtering device, i.e., continuous particle removal filter 124, that contains a series of vertical septa with filter media. An example of a suitable particle removal filter is the filter manufactured by SAMCO Technologies of Buffalo, N.Y. The media micron retention can be adjusted to the process requirements. Continuous particle removal filter 124 is designed to capture particles in the range of 20-100 microns. One filter element is backwashed at a time thus maintaining continuous forward flow. Continuous particle removal filter 124 is design to provide polishing filtration. The backwash from continuous particle removal filter 124 is sent back to the ocean via output 123. Chemical feeder 126, fed by water stream 128, may be included as needed for alkalinity adjustment of water feed 120. Chemical feeder 126 may also be used to condition a water supply that is not initially obtained from the ocean or other seawater source. Thus, the present invention is not limited to use on or near an ocean, the present invention may be used at any location where a sufficient water supply can be obtained or provided.

It should be appreciated that although the foregoing examples are largely described relative to use on a maritime platform, the present invention may also be used in a variety of other locations. For example, the present invention may be used at a coastal processing facility or an inland hydrofracturing operation. Such variations are within the spirit and scope of the claimed invention. Moreover, the present methods and system can be used for general gas purification as well as the purification of sour and acid gas, on maritime platforms as well as on land based operations. Equipment is selected based on requirements of small foot print and weight, continuous cleaning, ease of maintenance, flexible media types and ease of use and maintenance.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system adapted to separate a natural gas feed stream into a sweetened gas stream, at least one liquid waste stream and at least one gaseous waste stream, and to discharge, recover or destroy the at least one liquid waste stream and the at least one gaseous waste stream, the system comprising:
   a compression subsystem adapted to treat the natural gas feed stream to remove a first portion of the at least one liquid waste stream and to increase the natural gas feed stream to a process pressure greater than an initial entering pressure to form a pressurized natural gas stream;
   a gas pretreatment subsystem adapted to treat the pressurized natural gas stream to remove a second portion of the at least one liquid waste stream and to cool and filter the pressurized natural gas stream to form a filtered natural gas stream;
   an acid gas separation subsystem adapted to separate the filtered natural gas stream into the sweetened gas stream and a first portion of the at least one gaseous waste stream;
   a destruction subsystem adapted to incinerate the first portion of the at least one gaseous waste stream to form a flue gas; and,
   a feed water pretreatment subsystem comprising a water stream, wherein the water stream cools the pressurized natural gas stream in the gas pretreatment subsystem.

2. The system of claim 1 wherein the compression subsystem comprises at least one of: a liquid separation unit adapted to treat the natural gas feed to remove the first portion of the at least one liquid waste stream; and, a compressor adapted to increase a pressure of the natural gas feed stream to the process pressure.

3. The system of claim 1 wherein the gas pretreatment subsystem comprises at least one of: a gas cooler adapted to cool the pressurized natural gas stream; a liquid separation unit adapted treat the pressurized natural gas stream to remove the second portion of the at least one liquid waste stream; a heat exchanger adapted to cool the pressurized natural gas stream; and, a gas filter adapted to treat the pressurized natural gas stream to remove particulates and water vapor.

4. The system of claim 1 wherein the acid gas subsystem comprises at least one of: a first membrane separator adapted to separate the filtered natural gas stream into the sweetened gas stream and the first portion of the at least one gaseous waste stream; a second membrane separator adapted to treat the sweetened gas stream to remove a second portion of the at least one gaseous waste stream; and, a polisher adapted to polish the sweetened gas stream.

5. The system of claim 1 wherein the destruction subsystem comprises at least one of: an incinerator adapted to combust the first portion of the at least one gaseous waste stream; and, a heat exchanger adapted to cool the flue gas.

6. The system of claim 1 wherein the feed water pretreatment subsystem is adapted to filter the water stream to form a filtered water stream, and the filtered water stream cools the pressurized natural gas stream in the gas pretreatment subsystem.

7. The system of claim 6 wherein the feed water pretreatment subsystem comprises at least one of: a first continuous particle filter adapted to filter the water stream; a second continuous particle filter adapted to filter the water stream; and, a chemical feeder adapted to condition the filtered water stream.

8. The system of claim 6 further comprising:
   a scrubber reactor subsystem adapted to receive the filtered water stream and to remove at least one portion of the flue gas using the filtered water stream to form a vent gas stream and a wastewater stream, wherein the vent gas is exhausted to the atmosphere.

9. The system of claim 8 wherein the scrubber reactor subsystem comprises at least one of: a scrubber reactor adapted to remove at least one portion of the flue gas using the filtered water stream; and, a blower adapted to provide air to the scrubber reactor.

10. The system of claim 8 further comprising:
    a wastewater treatment subsystem adapted to filter the wastewater stream to form a discharge water stream.

11. The system of claim 10 wherein the wastewater treatment subsystem comprises at least one of: a particulate filter adapted to remove particulates from the wastewater stream; a metal unit adapted to remove metal from the wastewater stream; and, a mercury unit adapted to remove mercury from the wastewater stream.

* * * * *

UNITED STATES PATENT AND TRADEMARK OFFICE
CERTIFICATE OF CORRECTION

| | |
|---|---|
| PATENT NO. | : 8,790,452 B2 |
| APPLICATION NO. | : 13/772787 |
| DATED | : July 29, 2014 |
| INVENTOR(S) | : Richard Paul Posa |

It is certified that error appears in the above-identified patent and that said Letters Patent is hereby corrected as shown below:

In the claims

Column 15, line 36, "unit adapted treat the pressurized natural gas stream to" should read "unit adapted --to-- treat the pressurized natural gas stream to".

Signed and Sealed this
Sixteenth Day of February, 2016

Michelle K. Lee
*Director of the United States Patent and Trademark Office*